US 10,139,803 B2

United States Patent
Azuma et al.

(10) Patent No.: US 10,139,803 B2
(45) Date of Patent: Nov. 27, 2018

(54) INSTRUCTION VALUE GENERATION DEVICE

(71) Applicant: Mitsubishi Electric Corporation, Tokyo (JP)

(72) Inventors: Toshihiro Azuma, Tokyo (JP); Kotaro Nagaoka, Tokyo (JP); Tsuyoshi Kumazawa, Tokyo (JP); Akihiko Koide, Tokyo (JP); Wenjuan Wang, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 127 days.

(21) Appl. No.: 15/123,810

(22) PCT Filed: Apr. 16, 2014

(86) PCT No.: PCT/JP2014/060838
§ 371 (c)(1),
(2) Date: Sep. 6, 2016

(87) PCT Pub. No.: WO2015/159390
PCT Pub. Date: Oct. 22, 2015

(65) Prior Publication Data
US 2017/0017225 A1    Jan. 19, 2017

(51) Int. Cl.
G05B 19/25    (2006.01)
B23Q 15/12    (2006.01)

(52) U.S. Cl.
CPC .............. *G05B 19/25* (2013.01); *B23Q 15/12* (2013.01); *G05B 2219/41427* (2013.01)

(58) Field of Classification Search
None
See application file for complete search history.

(56) References Cited

U.S. PATENT DOCUMENTS

| 5,396,434 A | 3/1995 | Oyama et al. |
| 6,167,325 A | 12/2000 | Kamiguchi et al. |

(Continued)

FOREIGN PATENT DOCUMENTS

| JP | 4-52803 A | 2/1992 |
| JP | 6-110514 A | 4/1994 |

(Continued)

OTHER PUBLICATIONS

JPO Office Action for Application No. 2015-523738 dated Oct. 20, 2015.

(Continued)

*Primary Examiner* — Tuan C Dao
(74) *Attorney, Agent, or Firm* — Sughrue Mion, PLLC; Richard C. Turner

(57) ABSTRACT

A device comprises: a calculation unit calculating, based on a model on a calculator, a response path along which a target actually operates when an instruction path is given; a determiner determining a target path along which the target operates; a generation unit regenerating a temporary instruction path based on the target path and a temporary instruction response path obtained when the calculation unit is given the temporary instruction path; a determiner determining a convergence determination condition; and a comparator determining whether error between the temporary instruction response path and the target path is converged, based on the condition. Regenerating the path and calculating the temporary instruction response path are repeated until the comparator determines that the condition is met, and, when the comparator determines so, the temporary instruction path is output to a controller controlling the target, as the path for operating the target.

7 Claims, 11 Drawing Sheets

(56) References Cited

U.S. PATENT DOCUMENTS

| | | |
|---|---|---|
| 6,859,007 B2 | 2/2005 | Toyozawa et al. |
| 7,174,226 B2 | 2/2007 | Nakazato et al. |
| 8,067,918 B2 | 11/2011 | Okita et al. |
| 8,098,038 B2 | 1/2012 | Okita et al. |
| 8,662,799 B2 | 3/2014 | Takayama et al. |
| 8,938,316 B2 | 1/2015 | Otsuki et al. |
| 2007/0021868 A1 | 1/2007 | Nagatsuka et al. |
| 2007/0278980 A1* | 12/2007 | Wilson .................. G05B 19/25 318/573 |
| 2011/0087373 A1 | 4/2011 | Nagatsuka et al. |
| 2011/0185973 A1* | 8/2011 | Auger .................... C23C 16/34 118/724 |
| 2011/0190922 A1* | 8/2011 | Walker .................. B24B 13/06 700/118 |
| 2016/0250714 A1* | 9/2016 | Zhang ................ B23K 26/0622 219/121.61 |

FOREIGN PATENT DOCUMENTS

| | | |
|---|---|---|
| JP | 6-348316 A | 12/1994 |
| JP | 6-348317 A | 12/1994 |
| JP | 7-72933 A | 3/1995 |
| JP | 7-266267 A | 10/1995 |
| JP | 8-137531 A | 5/1996 |
| JP | 8-328632 A | 12/1996 |
| JP | 9-269808 A | 10/1997 |
| JP | 2692372 B2 | 12/1997 |
| JP | 3021156 B2 | 3/2000 |
| JP | 2000-101183 A | 4/2000 |
| JP | 3159889 B2 | 4/2001 |
| JP | 3286689 B2 | 5/2002 |
| JP | 3335714 B2 | 10/2002 |
| JP | 2004-348250 A | 12/2004 |
| JP | 3788539 B2 | 6/2006 |
| JP | 2006-281330 A | 10/2006 |
| JP | 3898686 B2 | 3/2007 |
| JP | 2007-136671 A | 6/2007 |
| JP | 4043996 B2 | 2/2008 |
| JP | 2010-237843 A | 10/2010 |
| JP | 4620159 B2 | 1/2011 |
| JP | 4728422 B2 | 7/2011 |
| JP | 4741637 B2 | 8/2011 |
| JP | 2012-243152 A | 12/2012 |
| JP | 2013-35095 A | 2/2013 |

OTHER PUBLICATIONS

International Search Report for PCT/JP2014/060838 dated Jul. 8, 2014 [PCT/ISA/210].

\* cited by examiner

INSTRUCTION VALUE GENERATION DEVICE

CROSS REFERENCE TO RELATED APPLICATIONS

This application is a National Stage of International Application No. PCT/JP2014/060838, filed on Apr. 16, 2014, the contents of all of which are incorporated herein by reference in their entirety.

FIELD

The present invention relates to a device that generates an instruction value for a machine having a driving system and particularly to a device that generates an instruction value for an NC machine tool.

BACKGROUND

A technique of generating an instruction corrected to provide a trajectory that is a target response result of a control target has been used hitherto in order to remove an error such as a response delay caused by characteristics of the control target. In particular, a technical field in which a cutting operation or turning operation is performed on a non-circular workpiece uses a technique of correcting an instruction position of a tool in order to achieve a high-speed and high-accurate machining operation. Such a technique is disclosed in, for example, Patent Literatures 1 to 3.

Patent Literature 1 discloses a technique for a cam grinder that machines a cam surface into a desired cam profile through a plurality of times of grinding operations on the basis of control data representing a relationship between a grinding wheel feeding amount and a main spindle rotation angle stored in advance in correspondence with the desired cam profile. In this technique, the difference between the grinding wheel feeding amount of the actual grinding operation and the grinding wheel feeding amount of the control data is obtained and the control data used in the next grinding operation is corrected on the basis of this difference.

Patent Literature 2 discloses a technique in which a machining error in a device that machines a non-circular workpiece is corrected by controlling a movement of a tool synchronized with the rotation of the workpiece. For this technique, a position of the tool that has moved in accordance with the instruction position that is the same as or similar to the target position of the tool is detected. Then, among the amplitude ratio, the phase difference, and the offset difference between the target position and such a detected position, at least the amplitude ratio and the phase difference are obtained. Subsequently, among three kinds of processing, i.e., processing that enlarges/reduces the instruction position on the basis of the amplitude ratio, phase-shift processing based on the phase difference, and processing that changes the offset of the instruction position on the basis of the offset difference, at least the enlargement/reduction processing and the phase-shift processing are performed to obtain a corrected instruction position.

Patent Literature 3 discloses a technique for a non-circular workpiece controlling method in which a machining tool is controlled such that a non-circular workpiece moves to the data position in accordance with the angle of a mounted main spindle, and the machining tool feeding position is controlled in synchronization with the rotation of the main spindle. For this method, first target input position Fourier transformation data is obtained by Fourier-transforming target input position data for controlling the position of the machining tool, an actual movement amount obtained by controlling the position of the machining tool is detected as actual movement amount data, first actual movement amount Fourier transformation data is obtained by Fourier-transforming the detected actual movement amount data, a transfer function as a ratio between the first target input position Fourier transformation data and the first actual movement amount Fourier transformation data is calculated, second correction target input position Fourier transformation data obtained by correcting the first target input position Fourier transformation data is calculated by the transfer function, second target input position data is newly obtained by inverse Fourier-transforming the second correction target input position Fourier transformation data, a transfer function as a ratio between second target position Fourier transformation data obtained by Fourier-transforming second target position data obtained from the second target input position data and second actual movement amount Fourier transformation data obtained by Fourier-transforming the second actual movement amount data is repeatedly obtained, third target input position Fourier transformation data is newly calculated by correcting the first target input position Fourier transformation data on the basis of the transfer function, and third target input position data is newly obtained by inverse Fourier-transforming the third target input position Fourier transformation data. In this way, the operation is controlled by the use of these data items.

CITATION LIST

Patent Literature

Patent Literature 1: Japanese Patent No. 2692372
Patent Literature 2: Japanese Patent No. 3021156
Patent Literature 3: Japanese Patent No. 3335714

SUMMARY

Technical Problem

However, the prior art disclosed in Patent Literatures 1 to 3 have a problem in that the technique can be applied only to a case where the same operation pattern is repeated. In Patent Literature 1, the difference between the grinding wheel feeding amount of the control data and the grinding wheel feeding amount of the actual grinding operation is obtained and the control data used in the next grinding operation is corrected on the basis of this difference. For this reason, this technique can be applied only to a case where the same operation pattern is repeated. In Patent Literature 2, it is premised that the same operation pattern is repeated in order to correct the amplitude ratio. In Patent Literature 3, since a correction is made in the frequency region by the Fourier transformation and the transfer function, this technique can be applied only to a case where the same operation pattern having a uniform frequency is repeated. However, there is also a non-true-circular mechanical component having an ellipticity that gradually changes in accordance with the longitudinal position. In such a component, since the operation pattern also changes in accordance with a change in cross-sectional shape, the techniques disclosed in Patent Literatures 1 to 3 cannot be used.

Further, in the techniques disclosed in Patent Literatures 1 to 3, the actual machine operation result is used for correction. However, the actual machine operation result has an error that is due to the characteristics of the control target and can be reproduced and an error that is due to a change in external environment and cannot be reproduced. Accordingly, a problem arises in that it is not possible to obtain only the error that actually needs to be corrected and that is due to the characteristics of the control target and can be reproduced. Accordingly, there is a possibility that an erroneous correction may be made due to the error that is due to a change in external environment and cannot be reproduced. Further, there is also a possibility that the phase difference corresponding to the response delay for the instruction may be estimated erroneously. Further, when an erroneous correction is made on the basis of the error that cannot be reproduced, the correction influences the next actual movement position. For this reason, there is a possibility that a convergence is not stable in a repeated training operation of minimizing the error from the target position through the repeated correction.

The present invention is made in view of the above-described circumstances and an object of the present invention is to provide an instruction value generation device capable of handling a machining operation during which an operation pattern changes and stably generating an instruction value.

Solution to Problem

In one aspect of the present invention, there is provided an instruction value generation device comprising: an instruction response calculation unit that predictively calculates, on a basis of a model on a calculator, a response path along which a control target is actually operated when an instruction path is given; a target path determination unit that determines a target path along which the control target is operated; an instruction path generation unit that regenerates a temporary instruction path such that an error between the target path and a temporary instruction response path obtained when the temporary instruction path is given to the instruction response calculation unit is smaller than a current value; a convergence-determination-condition determination unit that determines a convergence determination condition used in a determination processing of determining whether the error between the temporary instruction response path and the target path is converged; and a path comparison unit that performs the determination processing on a basis of the convergence determination condition, wherein the regeneration of the temporary instruction path by the instruction path generation unit and the calculation of the temporary instruction response path by the instruction response calculation unit are repeated until the path comparison unit determines that the convergence determination condition is met, and the temporary instruction path is output to a control device controlling the control target, as the instruction path for operating the control target when the path comparison unit determines that the convergence determination condition is met.

Advantageous Effects of Invention

There is an effect that the instruction value generation device according to the present invention can handle a machining operation during which the operation pattern changes and stably generate the instruction value.

DESCRIPTION OF EMBODIMENT

Hereinafter, an exemplary embodiment of an instruction value generation device according to the present invention will be described in detail with reference to the drawings. It is noted that the present invention is not limited to the embodiment.

Embodiment

Figure 1:
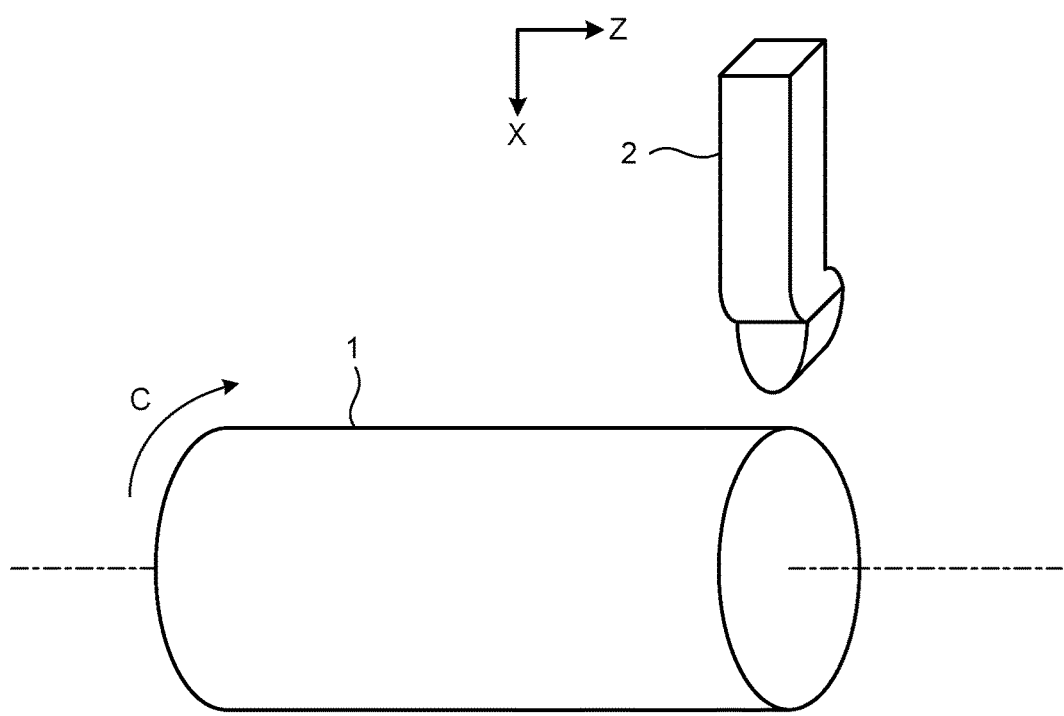
FIG. 1 is a view illustrating a configuration of a machine in which a main spindle is present on a workpiece-side and linear axes parallel and perpendicular to a rotation center axis of the main spindle is present on a tool-side.

Although a machine having a turning spindle on the workpiece-side and linear axes parallel and perpendicular to the rotation center axis of the spindle on the tool-side is used in machining a non-circular workpiece, and described as a control target in the embodiment, the machine is not limited to this configuration. FIG. 1 is a view illustrating the configuration of the machine in which the turning spindle is present on the side on which a workpiece 1 is present and the linear axes parallel and perpendicular to the rotation center axis of the spindle are present on the side on which a tool 2 is present. The spindle is named as a C axis, the linear axis parallel to the rotation center axis of the spindle is named as a Z axis, and the linear axis perpendicular to the rotation center axis of the spindle is named as an X axis.

Figure 2:
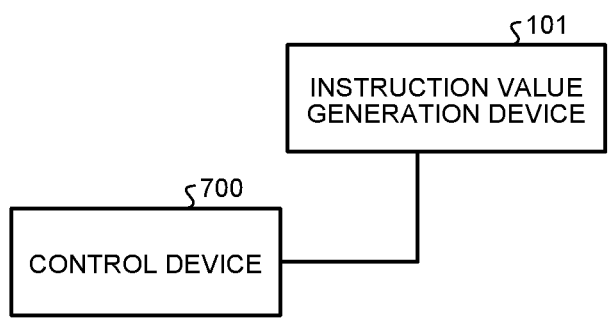
FIG. 2 is a diagram illustrating a state where an instruction value generation device according to an embodiment of the present invention is used.
Figure 3:
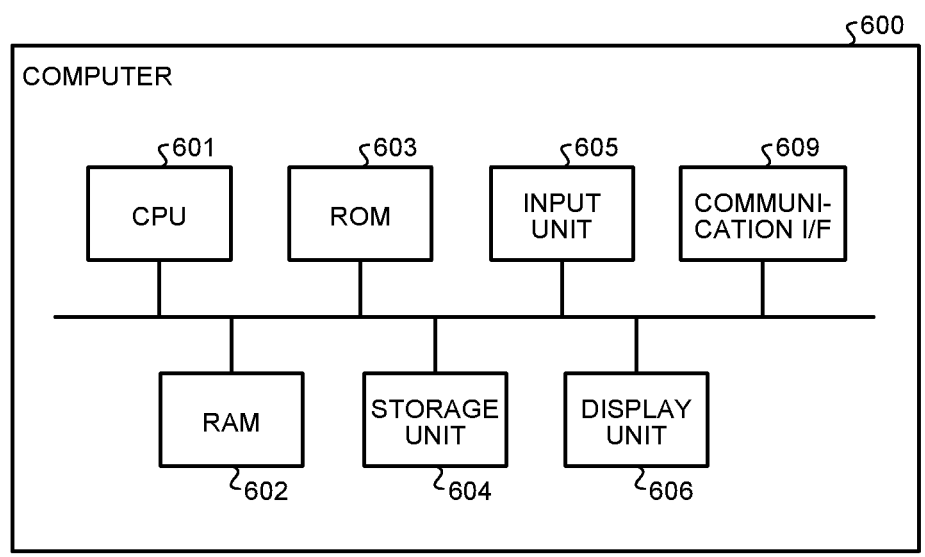
FIG. 3 is a diagram illustrating a hardware configuration of a computer that executes instruction value generation software.

FIG. 2 is a diagram illustrating a state where the instruction value generation device according to the embodiment of the present invention is used. An instruction value generation device 101 is a device that generates an instruction value to be output to a control device 700 controlling a control target, and is configured by installing instruction value generation software in a general computer. FIG. 3 is a diagram illustrating a hardware configuration of a computer that executes the instruction value generation software. A computer 600 includes a CPU (Central Processing Unit) 601, a RAM (Random Access Memory) 602, a ROM (Read Only Memory) 603, a storage unit 604, an input unit 605, a display unit 606, and a communication I/F (Interface) 609.

The CPU 601 is a calculation device that executes the instruction value generation software. The RAM 602 is a work area that is used when the CPU 601 executes a program. The ROM 603 stores a program (specifically, Initial Program Loader (IPL) or the like), executed by the CPU 601 when the computer 600 is activated, in a nonvolatile state. The storage unit 604 is a device that stores information in a nonvolatile state and a hard disk drive, a solid state drive, or the like can be applied thereto. The input unit 605 is a user interface that is used to input information by a user and a keyboard, a pointing device such as a mouse or a touch panel, or the like can be applied thereto. The display unit 606 is a device that displays information and an LCD (Liquid Crystal Display), an OLED (Organic Light Emitting Display), or the like can be applied thereto. The communication I/F 609 is an interface that is used to communicate with the control device 700.

Figure 4:
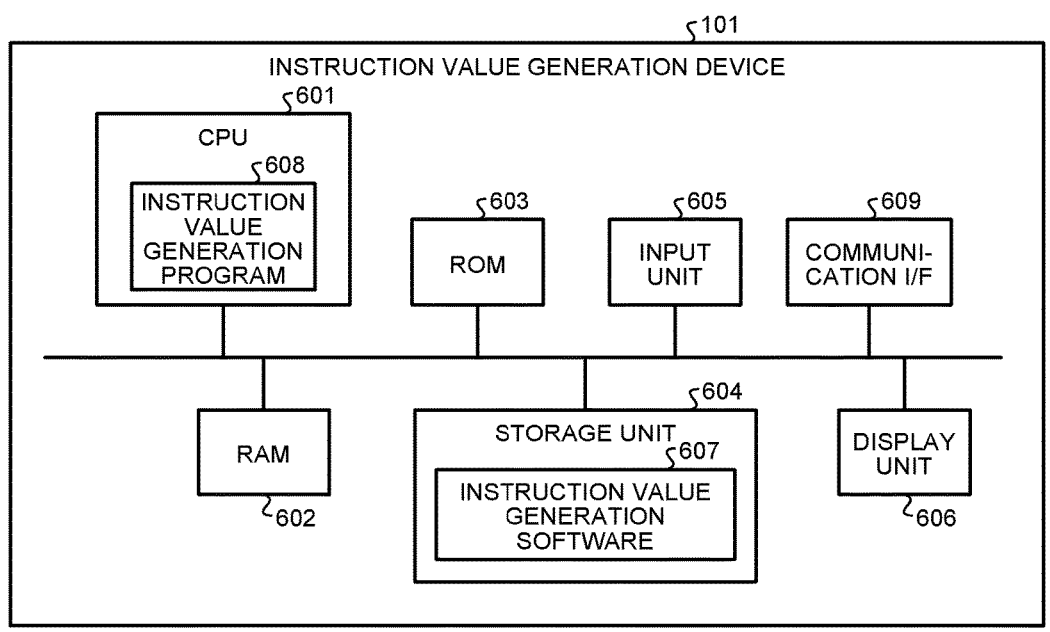
FIG. 4 is a diagram illustrating a computer that serves as the instruction value generation device.

The instruction value generation software installed in the computer 600 is stored in the storage unit 604. When instruction value generation software 607 stored in the storage unit 604 is read and executed by the CPU 601, the computer 600 serves as the instruction value generation device 101. FIG. 4 is a diagram illustrating a computer that serves as the instruction value generation device. In the instruction value generation device 101, an instruction value generation program 608 is executed on the CPU 601.

Figure 5:
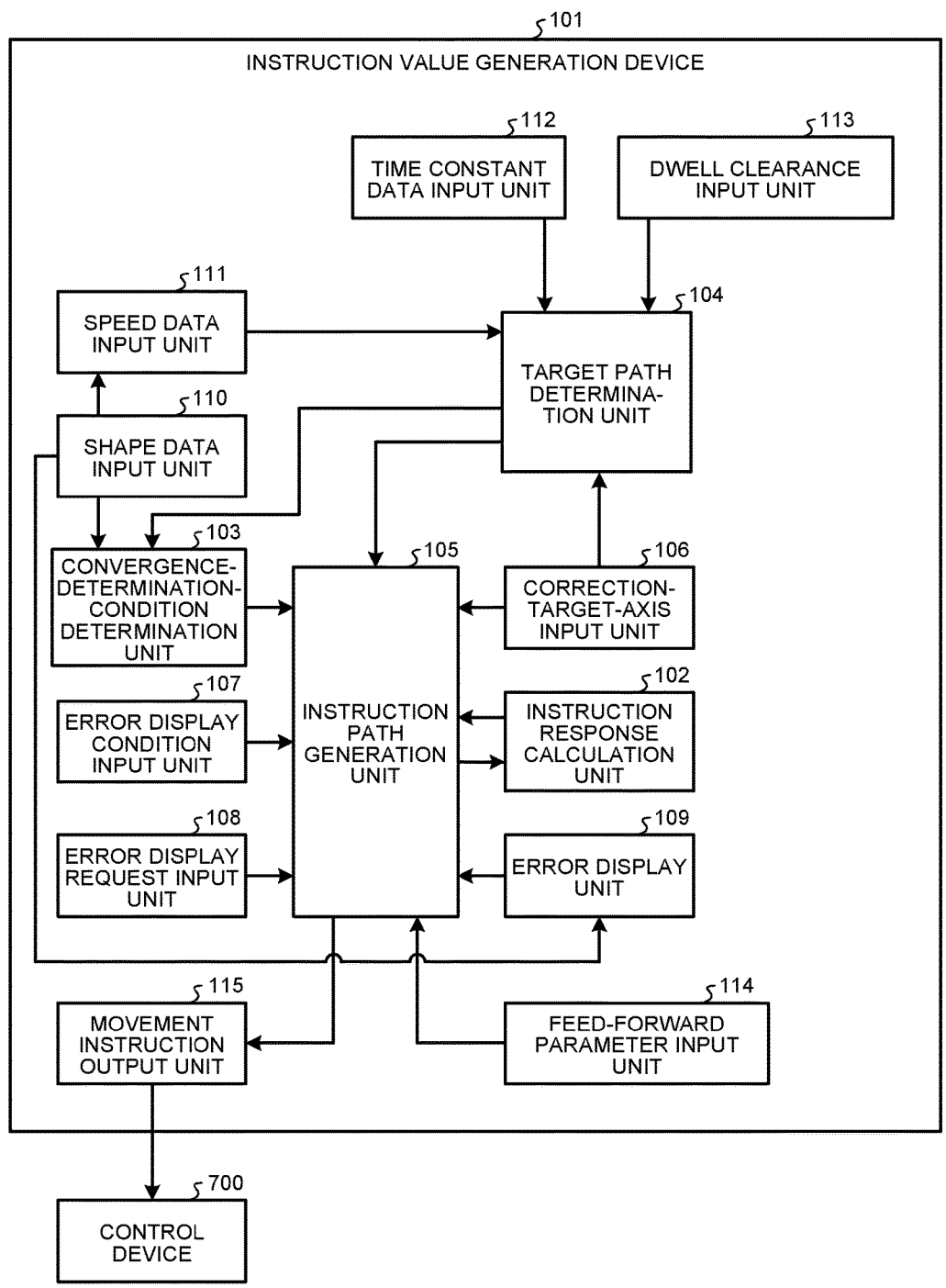
FIG. 5 is a diagram illustrating a functional configuration of the instruction value generation device according to the embodiment of the present invention.

FIG. 5 is a diagram illustrating a functional configuration of the instruction value generation device according to the embodiment of the present invention. The instruction value generation device 101 includes an instruction response calculation unit 102, a convergence-determination-condition determination unit 103, a target path determination unit 104, an instruction path generation unit 105, a correction-target-axis input unit 106, an error display condition input unit 107, an error display request input unit 108, and an error display unit 109. Further, the instruction value generation device 101 receives inputs from a shape data input unit 110, a speed data input unit 111, a time constant data input unit 112, a dwell clearance input unit 113, and a feed-forward parameter input unit 114, and gives the created instruction path to a movement instruction output unit 115. A detailed procedure of the instruction generation process will be described later.

The instruction response calculation unit 102 receives a temporary instruction path from the instruction path generation unit 105, calculates a response path for the temporary instruction path, and gives the calculated response path to the instruction path generation unit 105. Further, a detailed structure of the instruction response calculation unit 102 will be described later.

The convergence-determination-condition determination unit 103 receives a target path from the target path determination unit 104. Further, the convergence-determination-condition determination unit 103 receives, from the shape data input unit 110, shape data representing a finished shape of a workpiece. The convergence-determination-condition determination unit 103 adds a convergence determination condition to the target path and gives the instruction path generation unit 105 the target path having the convergence determination condition added. A detailed structure of the convergence-determination-condition determination unit 103 will be described later.

The target path determination unit 104 receives a correction target axis from the correction-target-axis input unit 106. Further, the target path determination unit 104 receives, from the speed data input unit 111, the shape data to which speed data on each part of the shape is added. Further, the target path determination unit 104 receives a time constant of each axis from the time constant data input unit 112. Further, the target path determination unit 104 receives, from the dwell clearance input unit 113, a dwell rotation number and a clearance distance obtained at the time of starting and ending an operation. The target path determination unit 104 creates the target path that should be achieved by a control target. Further, the target path determination unit 104 creates an initial value of a correction path that the instruction path generation unit 105 uses for generating an instruction, gives the target path to the convergence-determination-condition determination unit 103, and gives the initial value of the correction path to the instruction path generation unit 105. A detailed structure of the target path determination unit 104 will be described later.

The instruction path generation unit 105 receives, from the convergence-determination-condition determination unit 103, the target path having the convergence determination condition added thereto. The instruction path generation unit 105 receives the initial value of the correction path from the target path determination unit 104. The instruction path generation unit 105 receives the correction target axis from the correction-target-axis input unit 106. The instruction path generation unit 105 receives an error display condition from the error display condition input unit 107. The instruction path generation unit 105 receives, from the error display request input unit 108, a notification indicating that an error display request is made by the user.

The instruction path generation unit 105 receives, from the feed-forward parameter input unit 114, a parameter regarding a feed-forward processing. Then, the instruction path generation unit 105 generates the temporary instruction path and gives the temporary instruction path to the instruction response calculation unit 102. The instruction path generation unit 105 receives, from the instruction response calculation unit 102, the response path for the temporary instruction path and calculates an error between the target path and the response path. Then, the instruction path generation unit 105 checks whether an error display condition is met or the error display request is made by the user and, when any of these conditions is met, gives the calculated error to the error display unit 109. Further, the instruction path generation unit 105 determines whether a convergence determination condition is met, on the basis of the calculated error. When the convergence determination condition is not met, a series of operations of correcting the instruction path, calculating the response path, calculating the error, and determining whether the convergence determination condition is met are repeated. When the convergence determination condition is met, the created instruction path is given to the movement instruction output unit 115. A detailed structure of the instruction path generation unit 105 will be described later.

The correction-target-axis input unit 106 receives information on an axis that is a correction target, through the user's input operation on the input unit 605. The correction-target-axis input unit 106 gives this information to the target path determination unit 104 and the instruction path generation unit 105. That is, in the embodiment, since the instruction path includes a plurality of axis components, the correction-target-axis input unit 106 receives the correction target axis representing the axis component of the instruction path as the correction target, through the user's input operation of the input unit 605, and gives the correction target axis to the target path determination unit 104 and the instruction path generation unit 105. It is essential to correct the X-axis instruction value in order to machine the non-circular workpiece by using the device illustrated in FIG. 1. For this reason, the correction-target-axis input unit 106 may receive only inputs indicating whether the C axis is the correction target axis and whether the Z axis is the correction target axis, and may essentially set the X axis as the correction target axis.

The error display condition input unit 107 receives information on the error display condition through the user's input operation on the input unit 605, and gives the information to the instruction path generation unit 105.

The error display request input unit 108 is an input unit that displays an error at a predetermined timing at which the user desires to display an error and gives an error display request to the instruction path generation unit 105 when the error display request is input from the user through the input unit 605.

The error display unit 109 receives the error between the target path and the response path as well as the target path and the response path from the instruction path generation unit 105. The error display unit 109 receives, from the shape data input unit 110, the shape data representing the finished shape of the workpiece. The error display unit 109 displays at least one of the error between the target path and the response path, the target path, the response path, and an error in the shape data on the display unit 606. Examples of the error display method include a method of displaying a graph on the basis of a predetermined axis or time, a method of displaying an error such that the error overlaps the target path, the response path, or the shape data, and a method of displaying the target path, the response path, or the shape data while color-coding the path or data according to the degree of the error. However, the error display method is not limited to these methods.

The shape data input unit 110 receives information on the finished shape of the workpiece, through the user's input operation on the input unit 605, and gives the information to the convergence-determination-condition determination unit 103, the error display unit 109, and the speed data input unit 111.

The speed data input unit 111 receives the shape data representing the finished shape of the workpiece from the shape data input unit 110 and displays the received shape data on the display unit 606. Further, the speed data input unit 111 receives information on each axis speed of each zone of the shape data through the user's input operation on the input unit 605, and gives the target path determination unit 104 the shape data having the speed data added thereto.

The time constant data input unit 112 receives the time constant of each axis through the user's input operation on the input unit 605 and gives the time constant to the target path determination unit 104.

The dwell clearance input unit 113 receives the dwell rotation number and the clearance distance obtained at the time of starting and ending the operation of the machine, through the user's input operation on the input unit 605 and gives the dwell rotation number and the clearance distance to the target path determination unit 104.

The feed-forward parameter input unit 114 receives the parameter regarding a feed-forward processing, through the user's input operation on the input unit 605, and gives the parameter to the instruction path generation unit 105.

The movement instruction output unit 115 receives the created instruction path from the instruction path generation unit 105, creates a machining program for moving a control device on the basis of the instruction path, and outputs the created machining program to the control device 700 through the communication I/F 609.

The instruction value generation device 101 including the shape data input unit 110, the speed data input unit 111, the time constant data input unit 112, the dwell clearance input unit 113, and the feed-forward parameter input unit 114 has been exemplified. However, when a configuration is set so as to read previously stored data, the instruction value generation device 101 can be configured without the shape data input unit 110, the speed data input unit 111, the time constant data input unit 112, the dwell clearance input unit 113, or the feed-forward parameter input unit 114.

Figure 6:
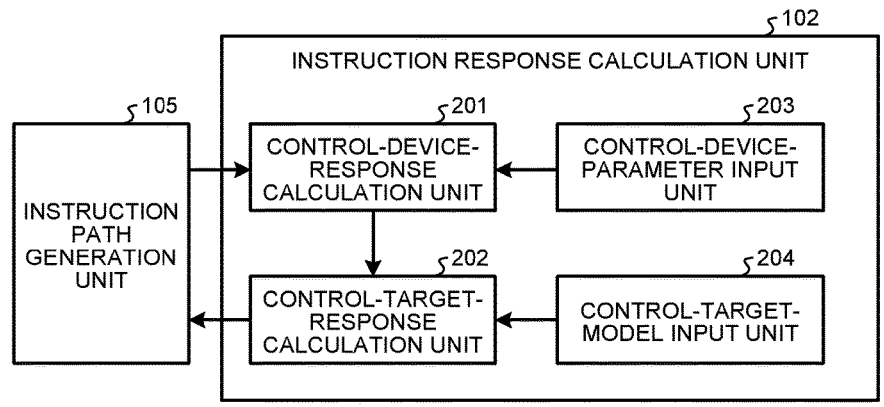
FIG. 6 is a diagram illustrating a configuration of an instruction response calculation unit.

FIG. 6 is a diagram illustrating a configuration of the instruction response calculation unit. The instruction response calculation unit 102 includes a control-device-response calculation unit 201, a control-target-response calculation unit 202, a control-device-parameter input unit 203, and a control-target-model input unit 204. The instruction-response-calculation unit 102 receives a parameter of the control device from the user by the use of the control-device-parameter input unit 203. The instruction response calculation unit 102 receives a parameter of a model of the control target by the use of the control-target-model input unit 204 through the user's input operation on the input unit 605. The instruction response calculation unit 102 receives the temporary instruction path from the instruction path generation unit 105, calculates the response path for the temporary instruction path by the use of the control-device-response calculation unit 201 and the control-target-response calculation unit 202, and gives the response path to the instruction path generation unit 105.

The control-device-response calculation unit 201 receives a parameter of the control device from the control-device-parameter input unit 203. The control-device-response calculation unit 201 receives the temporary instruction path from the instruction path generation unit 105. The control-device-response calculation unit 201 calculates a response indicated by the control device and gives the response to the control-target-response calculation unit 202.

The control-target-response calculation unit 202 receives a parameter of the model of the control target from the control-target-model input unit 204. The control-target-response calculation unit 202 receives, from the control-device-response calculation unit 201, the response indicated by the control device. The control-target-response calculation unit 202 calculates the response path indicated by the control target and gives the response path to the instruction path generation unit 105.

The control-device-parameter input unit 203 receives a parameter of the control device through the user's input operation on the input unit 605 and gives the parameter to the control-device-response calculation unit 201.

The control-target-model input unit 204 receives a parameter of the model of the control target through the user's input operation on the input unit 605 and gives the parameter to the control-target-response calculation unit 202.

Figure 7:
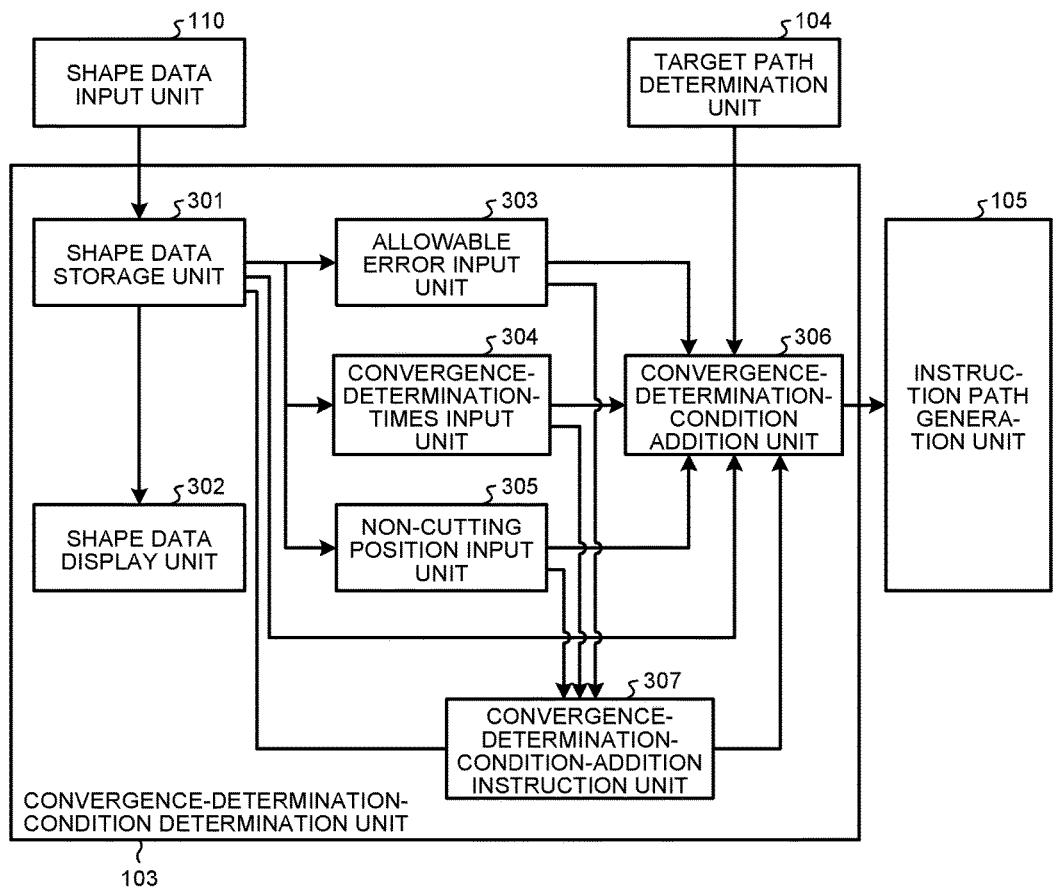
FIG. 7 is a diagram illustrating a configuration of a convergence-determination-condition determination unit.

FIG. 7 is a diagram illustrating a configuration of the convergence-determination-condition determination unit. The convergence-determination-condition determination unit 103 includes a shape data storage unit 301, a shape data display unit 302, an allowable error input unit 303, a convergence-determination-times input unit 304, a non-cutting position input unit 305, a convergence-determination-condition addition unit 306, and a convergence-determination-condition-addition instruction unit 307. The convergence-determination-condition determination unit 103 receives the shape data from the shape data input unit 110 and keeps the received shape data in the shape data storage unit 301. The convergence-determination-condition determination unit 103 receives the target path from the target path determination unit 104 and keeps the received target path in the convergence-determination-condition addition unit 306. Then, the convergence-determination-condition determination unit 103 displays the shape data by the use of the shape data display unit 302. The convergence-determination-condition determination unit 103 uses the allowable error input unit 303, the convergence-determination-times input unit 304, and the non-cutting position input unit 305 to receive, from the user's input, information on at least one of the allowable error, the number of times convergence determination is made, and the non-cutting position, for each part of the shape data. Then, the convergence-determination-condition determination unit 103 creates data in which a convergence condition for each zone is added to the target path data by the use of the convergence-determination-condition addition unit 306 that adds the convergence condition for each zone to the target path data, and gives the created data to the instruction path generation unit 105. The convergence-determination-condition-addition instruction unit 307 instructs the convergence-determination-condition addition unit 306 of a timing at which to start the creation of the data in which the convergence condition for each zone is added to the target path data.

The shape data storage unit 301 receives the shape data from the shape data input unit 110 and keeps the shape data. When the shape data storage unit 301 receives the shape data from the shape data input unit 110, the shape data storage unit notifies the convergence-determination-condition-addition instruction unit 307 of the receipt of the shape data and gives the shape data to the shape data display unit 302, the allowable error input unit 303, the convergence-determination-times input unit 304, the non-cutting position input unit 305, and the convergence-determination-condition addition unit 306.

The shape data display unit 302 receives the shape data from the shape data storage unit 301 and displays the shape data on the display unit 606.

The allowable error input unit 303 receives an allowable error for each part of the shape data displayed by the shape data display unit 302, through the user's input operation on the input unit 605, and keeps the input allowable error. Then, when the allowable error input unit 303 receives the allowable error through the user's input operation, the allowable error input unit notifies the convergence-determination-condition-addition instruction unit 307 of the occurrence of the input operation of the allowable error and gives the convergence-determination-condition addition unit 306 the allowable error for each part of the shape data.

The convergence-determination-times input unit 304 receives, from the user, an input about the number of times the convergence determination is made for each part of the shape data displayed by the shape data display unit 302, and keeps the input number of times the convergence determination is made. Then, when the convergence-determination-times input unit 304 receives the number of times of the convergence determination through the user's input operation, the convergence-determination-times input unit 304 notifies the convergence-determination-condition-addition instruction unit 307 of the occurrence of the input operation of the number of times the convergence determination is made, and gives the convergence-determination-condition addition unit 306 the number of times the convergence determination is made for each part of the shape data.

The non-cutting position input unit 305 receives information on whether each part of the shape data displayed by the shape data display unit 302 is related to the non-cutting position, through the user's input operation, and keeps the input non-cutting position information. Then, when the non-cutting position input unit 305 receives the information on whether it is the non-cutting position, through the user's input operation, the non-cutting position input unit 305 notifies the convergence-determination-condition-addition instruction unit 307 of the occurrence of the input operation of the information on whether it is the non-cutting position, and gives the convergence-determination-condition addition unit 306 the information on whether each part of the shape data is related to the non-cutting position.

The convergence-determination-condition addition unit 306 receives the target path from the target path determination unit 104. The convergence-determination-condition addition unit 306 receives the shape data from the shape data storage unit 301. The convergence-determination-condition addition unit 306 receives the allowable error for each part of the shape data from the allowable error input unit 303. The convergence-determination-condition addition unit 306 receives, from the convergence-determination-times input unit 304, the number of times the convergence determination is made for each part of the shape data. The convergence-determination-condition addition unit 306 receives, from the non-cutting position input unit 305, the information on whether each part of the shape data is related to the non-cutting position. When the convergence-determination-condition addition unit 306 receives the information on the target path, the information on the shape data, the information on the allowable error for each part of the shape data, the information on the number of times the convergence determination is made for each part of the shape data, and the information on whether each part of the shape data is related to the non-cutting position, the convergence-determination-condition addition unit 306 notifies the convergence-determination-condition-addition instruction unit 307 of the receipt of each information. Further, the convergence-determination-condition addition unit 306 creates the data in which the convergence condition for each zone is added to the target path data in response to the instruction from the convergence-determination-condition-addition instruction unit 307, and gives the data to the instruction path generation unit 105.

When the convergence-determination-condition-addition instruction unit 307 is notified by the convergence-determination-condition addition unit 306 of the receipt of all the information on the target path, the shape data, the allowable error for each part of the shape data, the number of times the convergence determination is made for each part of the shape data, and whether each part of the shape data is related to the non-cutting positon, the convergence-determination-condition-addition instruction unit 307 sends, to the convergence-determination-condition addition unit 306, an instruction to create the data in which the convergence condition for each zone is added to the target path data.

Figure 8:
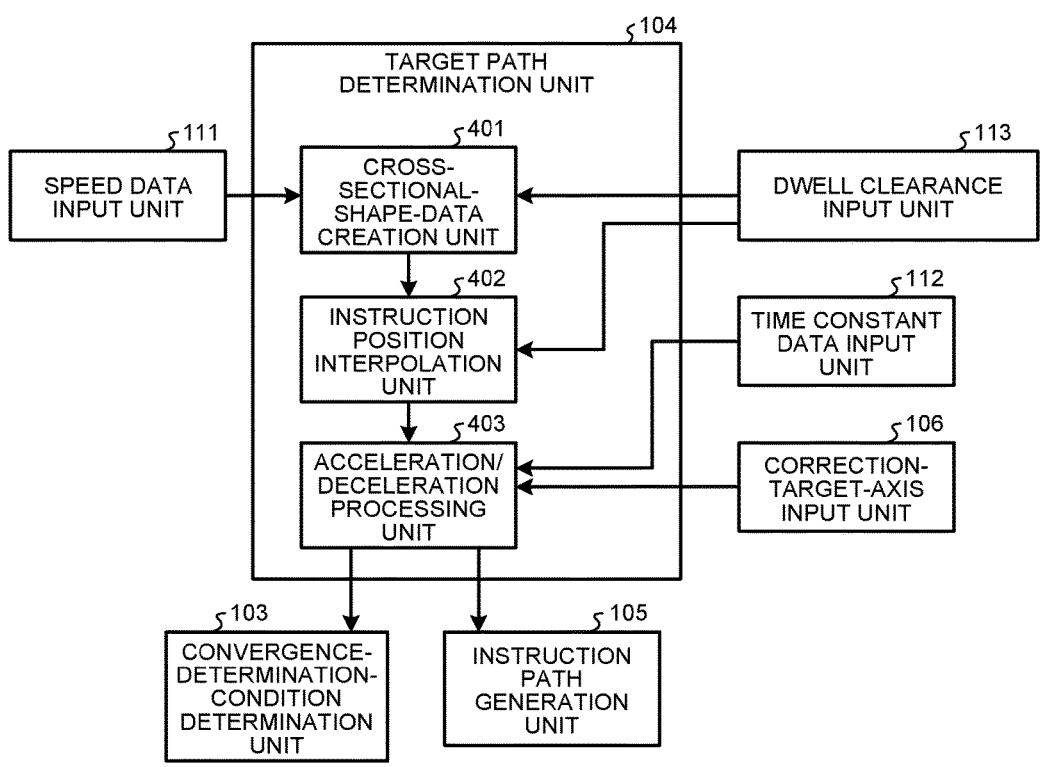
FIG. 8 is a diagram illustrating a configuration of a target path determination unit.

FIG. 8 is a diagram illustrating a configuration of the target path determination unit. The target path determination unit 104 includes a cross-sectional-shape-data creation unit 401, an instruction position interpolation unit 402, and an acceleration/deceleration processing unit 403. The acceleration/deceleration processing unit 403 of the target path determination unit 104 receives information on the correction target axis sent from the correction-target-axis input unit 106. The cross-sectional-shape-data creation unit 401 of the target path determination unit 104 receives, from the speed data input unit 111, the data having the shape data to which the speed data on each part of the shape is added. The acceleration/deceleration processing unit 403 of the target path determination unit 104 receives the time constant sent from the time constant data input unit 112. The target path determination unit 104 receives the dwell rotation number and the clearance distance sent from the dwell clearance input unit 113. Specifically, the dwell rotation number is received by the position instruction interpolation unit 402 and the clearance distance is received by the cross-sectional-shape-data creation unit 401. The target path determination unit 104 uses the cross-sectional-shape-data creation unit 401, the instruction position interpolation unit 402, and the acceleration/deceleration processing unit 403 to create the target path that should be achieved by the control target, and give this target path to the convergence-determination-condition determination unit 103. Further, the target path determination unit 104 creates the initial value of the correction path that the instruction path generation unit 105 uses for creating the instruction, and gives the initial value of the correction path to the instruction path generation unit 105.

The cross-sectional-shape-data creation unit 401 receives, from the speed data input unit 111, the shape data to which each axis speed data for each zone is added. The cross-sectional-shape-data creation unit 401 receives, from the dwell clearance input unit 113, the clearance distance at the time of starting and ending the operation. The cross-sectional-shape-data creation unit 401 creates a shape in which starting/ending parts of the shape data extend by the clearance distance. Then, the cross-sectional-shape-data creation unit 401 creates the cross-sectional shape data perpendicular to the Z axis at every interval equal to an advancement distance of the Z axis during one rotation of the C axis with respect to the created shape, and gives this cross-sectional shape data to the position instruction interpolation unit 402.

The position instruction interpolation unit 402 receives, from the dwell clearance input unit 113, the dwell rotation number at the time of starting and ending the operation. Further, the position instruction interpolation unit 402 receives the cross-sectional shape data from the cross-sectional-shape-data creation unit 401. Then, the instruction position interpolation unit 402 creates a path by interpolating the cross-sectional shape data, adds a path for several dwell rotations to the operation starting/ending part of the created path so as to create a path from the start of the operation to the end thereof, and gives the acceleration/deceleration processing unit 403 this path from the start of the operation to the end thereof.

The acceleration/deceleration processing unit 403 receives the correction target axis from the correction-target-axis input unit 106. Further, the acceleration/deceleration processing unit 403 receives the time constant of each axis from the time constant data input unit 112. Further, the acceleration/deceleration processing unit 403 receives the path from the start of the operation to the end thereof, from the instruction position interpolation unit 402 and creates the initial value of the correction path and the target path by performing the acceleration/deceleration processing on the received path. The acceleration/deceleration processing unit 403 gives the initial value of the correction path to the instruction path generation unit 105 and gives the target path to the convergence-determination-condition determination unit 103.

Figure 9:
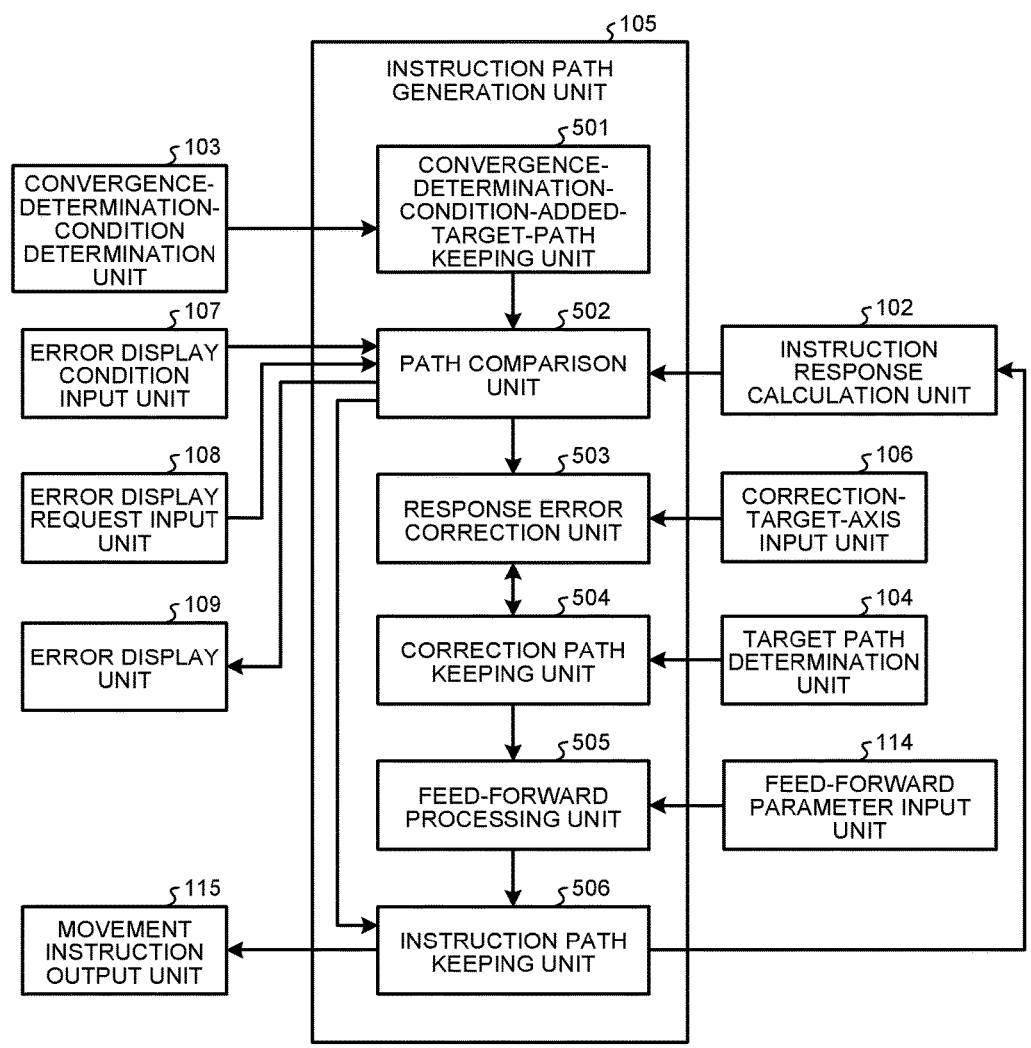
FIG. 9 is a diagram illustrating a configuration of an instruction path generation unit.

FIG. 9 is a diagram illustrating a configuration of the instruction path generation unit. The instruction path generation unit 105 includes a convergence-determination-condition-added-target-path keeping unit 501, a path comparison unit 502, a response error correction unit 503, a correction path keeping unit 504, a feed-forward processing unit 505, and an instruction path keeping unit 506. The convergence-determination-condition-added-target-path keeping unit 501 of the instruction path generation unit 105 receives, from the convergence-determination-condition determination unit 103, the target path to which the convergence determination condition for each zone sent is added, and keeps this target path. The correction path keeping unit 504 of the instruction path generation unit 105 receives the initial value of the correction path sent from the target path determination unit 104, and keeps this initial value. The response error correction unit 503 of the instruction path generation unit 105 receives the correction target axis sent from the correction-target-axis input unit 106. The path comparison unit 502 of the instruction path generation unit 105 receives the error display condition sent from the error display condition input unit 107. The path comparison unit 502 of the instruction path generation unit 105 receives, from the error display request input unit 108, a notification indicating that the error display request is made by the user. Then, the instruction path generation unit 105 acquires the correction path from the correction path keeping unit 504, generates the temporary instruction path by using the feed-forward processing unit 505, and keeps the generated temporary instruction path in the instruction path keeping unit 506. Then, the instruction path generation unit 105 gives the generated temporary instruction path to the instruction response calculation unit 102, receives at the path comparison unit 502 the response path for the temporary instruction path sent from the instruction response calculation unit 102, and calculates the error between the target path and the response path by the path comparison unit 502. Then, the path comparison unit 502 checks whether the error display condition is met or the user requests the error display and, when any of these conditions is met, gives the calculated error to the error display unit 109. Further, the instruction path generation unit 105 determines whether the convergence determination condition is met on the basis of the calculated error. When the convergence determination condition is not met, a series of operations of using the response error correction unit 503 to correct the instruction path, calculating the response path, calculating the error, and determining whether the convergence determination condition is met are repeated. When the convergence determination condition is met, the path kept in the instruction path keeping unit 506 is given to the movement instruction output unit 115.

The convergence-determination-condition-added-target-path keeping unit 501 receives, from the convergence-determination-condition determination unit 103, the target path to which the convergence determination condition for each zone is added, and gives this target path to the path comparison unit 502 while keeping the target path.

The path comparison unit 502 receives the response path from the instruction response calculation unit 102. The path comparison unit 502 receives the error display condition from the error display condition input unit 107. The path comparison unit 502 is notified by the error display request input unit 108 that the user requests the error display. The path comparison unit 502 receives the target path from the convergence-determination-condition-added-target-path keeping unit 501. The path comparison unit 502 calculates the error between the target path and the response path. Then, the path comparison unit 502 checks whether the error display condition is met or the error display is requested by the user, and, when any of these conditions is met, gives the calculated error to the error display unit 109. Further, the path comparison unit 502 determines whether the convergence determination condition is met on the basis of the calculated error, and notifies the instruction path keeping unit 506 of the determination result.

The response error correction unit 503 receives the error between the target path and the response path from the path comparison unit 502. The response error correction unit 503 receives the correction path from the correction path keeping unit 504. Further, the response error correction unit 503 receives information on the correction target axis sent from the correction-target-axis input unit 106. The response error correction unit 503 changes the correction path for the correction target axis on the basis of the error between the target path and the response path and gives the changed correction path to the correction path keeping unit 504.

The correction path keeping unit 504 receives the initial value of the correction path from the target path determination unit 104, gives the correction path to the response error correction unit 503, receives the changed correction path from the response error correction unit 503, and gives the correction path to the feed-forward processing unit 505 while keeping the correction path.

The feed-forward processing unit 505 receives the parameter regarding the feed-forward processing from the feed-forward parameter input unit 114. The feed-forward processing unit 505 receives the correction path from the correction path keeping unit 504. The feed-forward processing unit 505 performs the feed-forward processing on the correction path and gives the created instruction path to the instruction path keeping unit 506.

The instruction path keeping unit 506 receives the instruction path from the feed-forward processing unit 505. The instruction path keeping unit 506 keeps the instruction path. The instruction path keeping unit 506 gives the instruction path to the instruction response calculation unit 102 or the movement instruction output unit 115 depending on the determination result notified by the path comparison unit 502.

Figure 10:
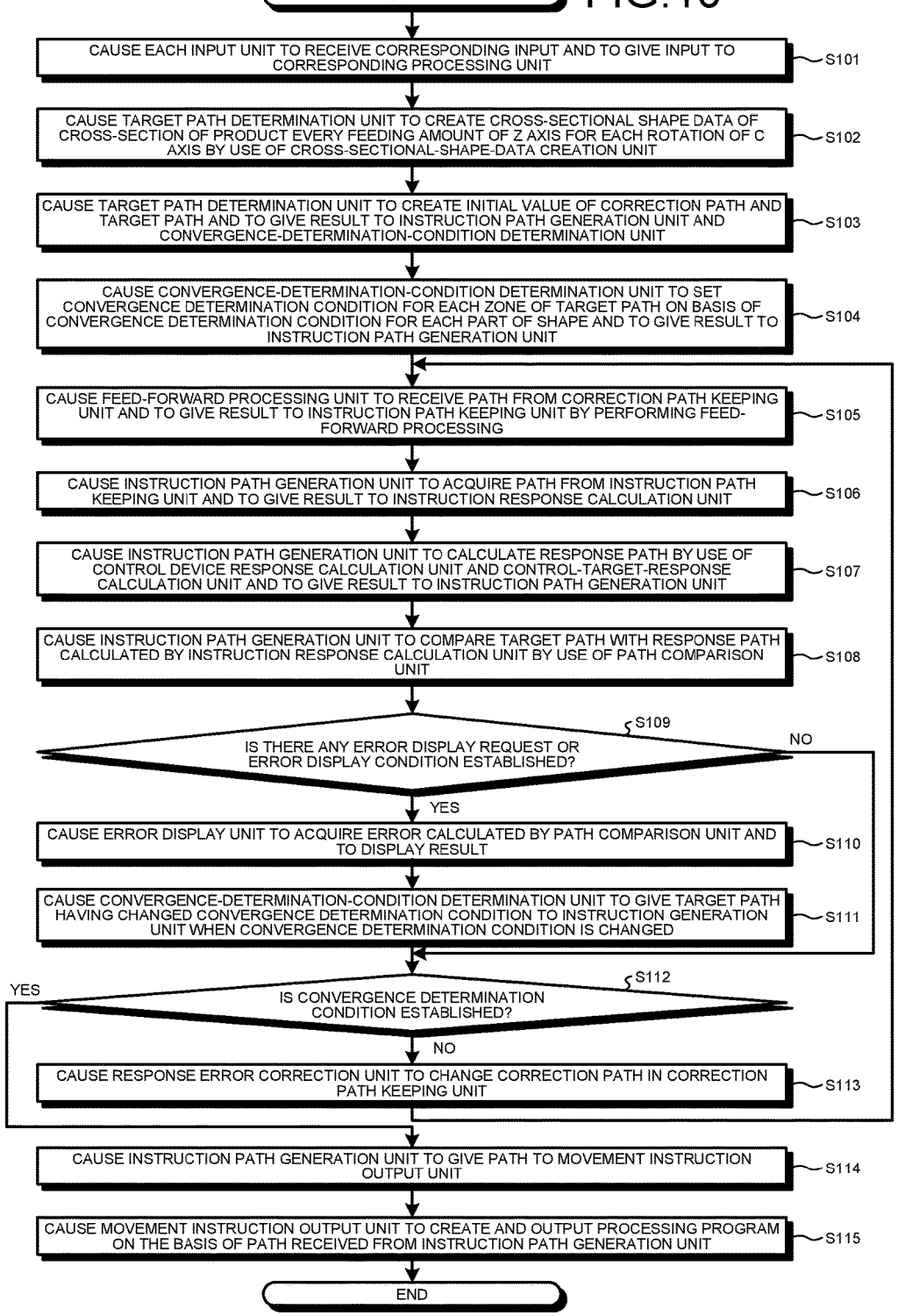
FIG. 10 is a flowchart illustrating an instruction generation process.

Hereinafter, a sequence of the instruction generation processing of the present embodiment will be described. FIG. 10 is a flowchart illustrating a sequence of the instruction generation processing. First, each input unit receives an input from the user and gives the received input to the corresponding processing unit (step S101).

Specifically, first, the shape data input unit 110 receives data on the finished shape of the workpiece and gives the received shape data to the convergence-determination-condition determination unit 103, the error display unit 109, and the speed data input unit 111. At this time, as a shape data expressing method, the shape data may be expressed as a three-dimensional model created by a CAD (Computer Aided Design), the shape data may be expressed as a cross-sectional shape parallel to the Z axis given to each predetermined angle of the C axis, or the shape data may be expressed as a cross-sectional shape perpendicular to perpendicular to the Z axis given to each predetermined position of the Z axis. However, in the present invention, the shape data expressing method is not limited thereto.

Figure 11:
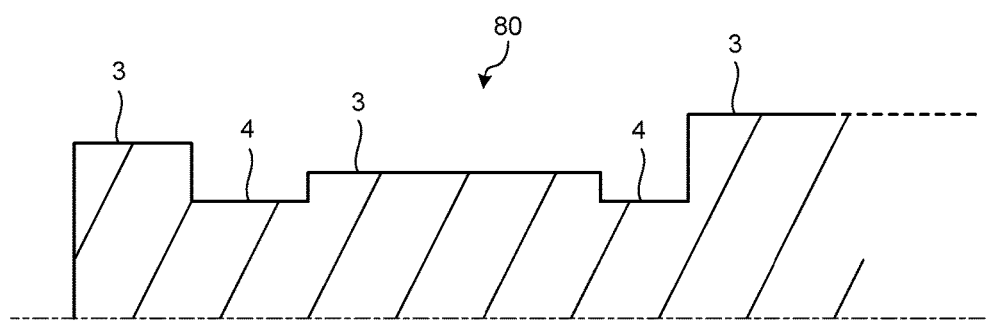
FIG. 11 is a cross-sectional view illustrating an example of a piston as one of non-circular workpieces.

FIG. 11 is a cross-sectional view illustrating an example of a piston as one of the non-circular workpieces. As illustrated in FIG. 11, a piston 80 has a configuration in which a groove 4 into which a piston ring is fitted is present between non-circular machined parts 3. Typically, the groove 4 is machined before or after machining is performed on the non-circular machined parts 3. For that reason, there is no need to input the shape of the groove 4 when the user inputs the finished shape of the workpiece. In other words, a shape of smoothly connecting the grooves 4 may be input instead of directly inputting the shape of the groove 4. Alternatively, the user may input only the shape of the machined parts 3 and the shape data input unit 110 may interpolate the shape data to connect both ends of the position having no shape input.

Next, the correction-target-axis input unit 106 receives the user's input for the axis that is the correction target, and gives the input to the target path determination unit 104 and the instruction path generation unit 105.

Next, the error display condition input unit 107 receives the error display condition input from the user and gives the error display condition to the instruction path generation unit 105. The error display condition mentioned herein is, for example, where the number of times the correction processing is repeated inside the instruction path generation unit 105 exceeds a predetermined number of times, where an error amount between the target path and the response path becomes equal to or smaller than a predetermined amount, or where the convergence determination condition is met.

Next, the speed data input unit 111 displays the shape data received from the shape data input unit 110, receives the user's input about each axis speed of each zone of the shape data, creates the shape data to which the speed data of each axis is added, and gives the target path determination unit 104 the shape data having the added speed data. The speed data input unit 111 and the shape data input unit 110 may not be separately provided and the speed of each zone may be input when the shape data is input to the shape data input unit 110.

Next, the time constant data input unit 112 receives the user's input about the time constant of each axis, and gives the time constant to the target path determination unit 104.

Next, the dwell clearance input unit 113 receives the user's input about the dwell rotation number and the clearance distance at the time of starting and ending the operation of the machine, and gives the dwell rotation number and the clearance distance to the target path determination unit 104.

Next, the feed-forward parameter input unit 114 receives the parameter regarding the feed-forward processing from the user and gives the parameter to the instruction path generation unit 105. The feed-forward amount mentioned herein indicates, for example, a correction amount for a delay that can be corrected by a calculation among delays in a feed-back loop of a control system or a correction amount for a backlash or a lost motion generated when the axis undergoes the reverse rotation. Since some parameters input to the feed-forward parameter input unit 114 are common to a parameter input to the control-target-model input unit 204 and a parameter input to the control-device-parameter input unit 203, the common parameters may be obtained by reading the values input to the control-device-parameter input unit 203 and the control-target-model input unit 204 instead of inputting values to the feed-forward parameter input unit 114.

Next, the instruction response calculation unit 102 uses the control-device-parameter input unit 203 and the controltarget-model input unit 204 to receive the user's input about the parameter of the model for calculating the response path.

Specifically, first, the control-device-parameter input unit 203 receives the user's input about the parameter of the control device and gives the parameter to the control-device-response calculation unit 201. The control device parameter mentioned herein, for example, indicates parameters set in a numerical control device and a servo amplifier and includes parameters of a position feed-back gain, a speed feed-back gain, a current feed-back gain, and inertia, viscosity, or elasticity of a control target, a parameter of a resonance frequency or an anti-resonance frequency caused by inertia, viscosity, and elasticity, a correction parameter of a backlash or a lost motion when the rotation of the axis is reverse, a correction parameter of a thermal displacement, a correction parameter of a displacement caused by a reaction force during the machining, or parameters of various filter processes inside the control device. Further, the control device used in the present embodiment is a combination of the numerical control device and the servo amplifier, but the control device is not limited thereto.

The control-target-model input unit 204 receives the user's input about the parameter of the control target model and gives the parameter to the control-target-response calculation unit 202. The parameter of the control target model mentioned herein, for example, indicates a parameter for simulating the behavior of the control target on a calculator and includes a parameter of inertia, viscosity, or elasticity of a control target, a parameter of a resonance frequency or an anti-resonance frequency caused by inertia, viscosity, or elasticity, a parameter of a backlash or a lost motion when the rotation of the axis is reversed, a parameter of a thermal displacement, a parameter of a displacement amount caused by a reaction force during the machining, and a sampling time obtained when simulating the behavior of the control target on the calculator.

That is, the instruction response calculation unit 102 includes a parameter and a model that are necessary to simulate at least one of the behavior caused by the inertia of the control target, the behavior caused by the viscosity of the control target, the behavior caused by the elasticity of the control target, the behavior of the control target when the rotation of the axis is reversed, the behavior of the control target when the control target is affected by thermal displacement, the behavior of the control target when the control device receives a reaction force during the machining, the behavior of the position feed-back loop processing inside the control device, the behavior of the speed feed-back loop processing inside the control device, the behavior of the current feed-back loop processing inside the control device, the behavior of the processing performed inside the control device so as to correct an influence caused by inertia, the behavior of the processing performed inside the control device so as to correct an influence caused by viscosity, the behavior of the processing performed inside the control device so as to correct an influence caused by elasticity, the behavior of the processing performed inside the control device so as to correct an influence caused by the reverse rotation of the axis, the behavior of the processing performed inside the control device so as to correct an influence of a thermal displacement, the behavior of the processing performed inside the control device so as to correct an influence of a reaction force during the machining, and the behavior of the filter processing performed inside the control device so as to smoothen an instruction value.

Next, the convergence-determination-condition determination unit 103 keeps the shape data, received from the shape data input unit 110, in the shape data storage unit 301. Then, the convergence-determination-condition determination unit 103 displays the shape data by using the shape data display unit 302 in the convergence-determination-condition determination unit 103, and receives the user's input by using the allowable error input unit 303, the convergence-determination-times input unit 304, and the non-cutting position input unit 305 in the convergence-determination-condition determination unit 103.

Specifically, the allowable error input unit 303 first receives the user's input about the allowable error for each part of the shape data displayed by the convergence-determination-condition determination unit 103 and keeps the input allowable error. At the same time, when receiving the input from the user, the allowable error input unit 303 notifies the convergence-determination-condition determination unit 103 of the occurrence of the input.

Further, the convergence-determination-times input unit 304 receives the user's input about the number of times the convergence determination is made for each part of the shape data displayed by the convergence-determination-condition determination unit 103 and keeps the input number of times the convergence determination is made. At the same time, when receiving the input from the user, the convergence-determination-times input unit 304 notifies the convergence-determination-condition determination unit 103 of the occurrence of the input.

Further, the non-cutting position input unit 305 receives the user's input about whether each part of the shape data displayed by the convergence-determination-condition determination unit 103 including the non-cutting position input unit 305 is related to the non-cutting position, and keeps the input non-cutting position information. At the same time, when receiving the input from the user, the non-cutting position input unit 305 notifies the convergence-determination-condition determination unit 103 of the input. The non-cutting position mentioned herein indicates, for example, the groove 4 in the piston 80. With regard to the input of the shape data into the aforementioned shape data input unit 110, when only the shapes of the machined parts 3 are input to the shape data input unit 110 and the shape data storage unit [120] 301 interpolates the machined parts 3, the convergence-determination-condition determination unit 103 may set the position having no shape input as the non-cutting position instead of the user's designating the non-cutting position.

Instead of the simultaneous receipt of the input of each of the allowable error input unit 303, the convergence-determination-times input unit 304, and the non-cutting position input unit 305 after the convergence-determination-condition determination unit 103 displays the shape data, the allowable error input unit 303, the convergence-determination-times input unit 304, and the non-cutting position input unit 305 may be separately operated such that each input unit displays the shape data and receives the input corresponding to each input unit.

As a method in which each input unit receives an input from the user, the present invention is not limited to the above-described interactive method in which each input unit displays the shape data on a screen and the user inputs an input value on the screen. For example, a method may be employed in which a predetermined file is read or these files are allocated in a predetermined folder.

Further, when there is no input to each input unit, a predetermined value may be used.

Figure 12:
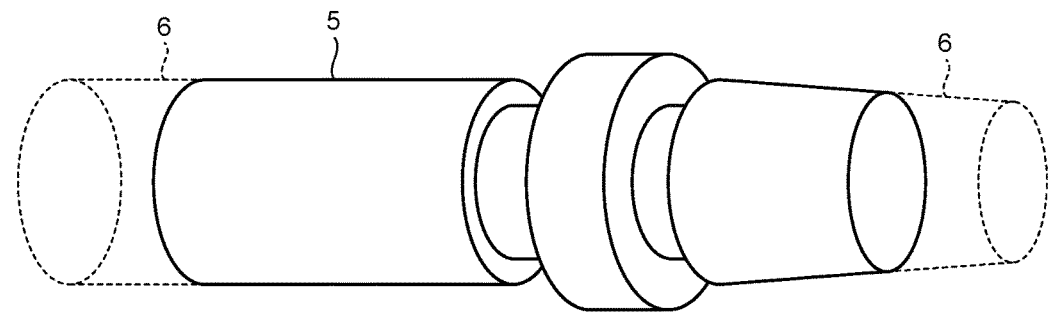
FIG. 12 is a diagram illustrating an example of a shape in which an extension shape corresponding to a clearance is added to both ends of a finished shape.

Next, the target path determination unit 104 uses the cross-sectional-shape-data creation unit 401 therein to create the cross-sectional shape data at every interval equal to a movement distance of the Z axis during one rotation of the C axis with respect to the shape in which the extension shape corresponding to the clearance distance is added to both ends of the finished shape (step S102). FIG. 12 is a view illustrating an example of a shape in which the extension shape corresponding to the clearance is added to both ends of the finished shape of the workpiece. When the extension shape 6 corresponding to the clearance distance is added to both ends of the finished shape 5 of the workpiece, it is desirable to change the cross-sectional shape of the extension portion in the Z-axis direction, taking account of a change in cross-sectional shape in the Z-axis direction, such as a radius and a non-circular displacement amount. Further, a distance necessary for the Z-axis acceleration/deceleration may be calculated in advance from the Z-axis time constant before the cross-sectional shape data is created. Then, when the clearance distance is shorter than the distance necessary for the Z-axis acceleration/deceleration, the clearance distance may be replaced by the distance necessary for the Z-axis acceleration/deceleration. Instead of creating the cross-sectional shape data on the shape in which the extension shape 6 corresponding to the clearance distance is added to both ends of the finished shape 5, the cross-sectional shape data may be created for the finished shape 5 and the cross-sectional shape data on the both ends may be copied by the clearance distance at every interval equal to a movement distance of the Z axis during one rotation of the C axis.

Next, the target path determination unit 104 uses the instruction position interpolation unit 402 and the acceleration/deceleration process unit 403 provided therein to interpolate the cross-sectional shape data to create not only the target path that should be achieved by the control target but also the initial value of the correction path that the instruction path generation unit 105 uses for generating the instruction, and then give the target path and the initial value of the correction path to the convergence-determination-condition determination unit 103 and the instruction path generation unit 105, respectively (step S103).

Specifically, the target path determination unit 104 uses the instruction position interpolation unit 402 to create the movement instruction for the Z axis and the C axis by calculating, in accordance with the Z-axis speed and the C-axis speed, the Z-axis position and the C-axis position for each cycle in which the instruction is given to the control device. Next, the target path determination unit 104 adds the C-axis movement instruction corresponding to the number of dwell rotations before and after the created Z-axis position and C-axis position. At this time, it is assumed that the Z-axis movement instruction in the start-time dwell state and the Z-axis movement instruction in the end-time dwell state are respectively stopped at the initial instruction position and the final instruction position of the created Z-axis movement instruction. Further, the number of rotations necessary for the C-axis acceleration/deceleration may be calculated in advance from the C-axis time constant. Then, when the given number of dwell rotations is smaller than the number of rotations necessary for the C-axis acceleration/deceleration, the number of dwell rotations may be replaced by the number of rotations necessary for the C-axis acceleration/deceleration. In addition, it may be determined whether the number of rotations necessary for the C-axis acceleration/deceleration is satisfied by the comparison with the sum of the number of dwell rotations and the number of the C-axis rotations corresponding to the clearance portion, rather than by the comparison with the number of dwell rotations.

Next, the target path determination unit 104 uses the acceleration/deceleration processing unit 403 to calculate positions by performing the acceleration/deceleration processing at the Z-axis position and the C-axis position. Next, the target path determination unit 104 acquires the cross-sectional shape data located before and behind the Z-axis position after the acceleration/deceleration processing and calculates the X-axis position at an angle corresponding to the C-axis position after the acceleration/deceleration, from the pre-cross-sectional shape data and the post-cross-sectional shape data. Next, the target path determination unit 104 obtains the X-axis position corresponding to the Z-axis position and the C-axis position after the acceleration/deceleration by the interpolation from each of the X-axis positions calculated from the pre-cross-sectional shape data and the post-cross-sectional shape data on the basis of a relationship between the Z position after the acceleration/deceleration and the Z-direction position of the pre-cross-sectional shape data and the post-cross-sectional shape data. Instead of the interpolation of the X-axis position calculated from the pre-cross-sectional shape data and the post-cross-sectional shape data, a fitting position of a curve such as a spline may be obtained for the X-axis position calculated from the pre-cross-sectional shape data and the post-cross-sectional shape data.

Finally, the path at the created interpolation position is given as the initial value of the correction path and the target path to the instruction path generation unit 105 and the convergence-determination-condition determination unit 103.

In the above-described example, a case is assumed in which the instruction position after the acceleration/deceleration process is given to the control device and the acceleration/deceleration processing is not performed in the control device, but the present invention is not limited thereto. For example, the instruction position before the acceleration/deceleration processing may be given to the control device and the control device may perform the acceleration/deceleration processing. When the acceleration/deceleration processing is performed by the control device, with regard to the initial value of the correction path given to the instruction path generation unit 105, the value before the acceleration/deceleration process is used instead of the value after the acceleration/deceleration processing as the value of the instruction position for the Z axis and the C axis. Further, even when the acceleration/deceleration processing is performed by the control device, the instruction position after the acceleration/deceleration processing may be used as the target path given to the convergence-determination-condition determination unit 103 in a similar manner to the above. Further, when the acceleration/deceleration processing is performed by the control device, the control-device-parameter input unit 203 in the instruction response calculation unit 102 receives the input of the time constant data and gives the time constant data to the control-device-response calculation unit 201 so that the instruction response calculation unit 102 simulates the acceleration/deceleration processing. Further, since there is a possibility that the time delay amount caused by the acceleration/deceleration processing may be different for each of the Z axis and the C axis, it is preferable that the time delay amount of each axis due to the acceleration/deceleration processing is calculated in advance and the operation of the axis having a large time delay starts earlier than the axis having a small time delay so as to remove the difference in time delay. This enables the synchronization of the Z axis and the C axis to be maintained. Further, when the Z axis and the C axis are set as the correction target axis, it is thought that the Z axis and the C axis can follow the instruction without the acceleration/deceleration processing. For this reason, the target of the acceleration/deceleration processing may be an axis other than the correction target axis.

Next, the convergence-determination-condition determination unit 103 uses the convergence-determination-condition addition unit 306 to create the target path having the added convergence determination condition for each zone, by reflecting the convergence determination condition for each part of the previously received finished shape in the target path received from the target path determination unit 104 and give the created target path to the instruction path generation unit 105 (step S104).

Additionally, the minimum unit mentioned herein indicates a trajectory connecting the adjacent instruction positions.

Next, the instruction path generation unit 105 uses the feed-forward processing unit 505 to add the feed-forward amount to the instruction position of the path kept in the correction path keeping unit 504, and keeps the created instruction path in the instruction path keeping unit 506 (step S105). As described above, the feed-forward amount mentioned herein indicates, for example, a correction amount for a delay that can be corrected by a calculation among the delays in the feed-back loop of the control system or a correction amount for a backlash or a lost motion occurring when the rotation of the axis is reversed. However, such a correction may be performed by the processing in the control device instead of the correction for the instruction value. Further, in case, for example, the created instruction path created by the feed-forward processing unit 505 has an extremely high-speed position, the feed-forward processing unit 505 may display a warning to the user when the speed exceeds a predetermined value.

Next, the instruction path generation unit 105 gives the generated instruction path to the instruction response calculation unit 102 (step S106).

Next, the instruction response calculation unit 102 uses the control-device-response calculation unit 201 and the control-target-response calculation unit 202 to calculate the response path for the instruction path received from the instruction path generation unit 105, and give the response path to the instruction path generation unit 105 (step S107).

At this time, the configuration of the actual software of the control device is simulated as the model used in the calculation of the control-device-response calculation unit 201. It is desirable to use a model in which the actual operation cycle of the control device is set as a sampling time in order to faithfully reproduce the response of the actual control device. It is noted that the model used in the calculation of the control-device-response calculation unit 201 is not limited to this configuration. Further, when the other models are used, the control device is operated every sampling cycle and hence a model expressed by a discrete time system is more desirable than a model expressed by a continuous time system.

Further, as the model used for the calculation of the control-target-response calculation unit 202, a model in which a relationship between the components of the control target is expressed as a block diagram, a purge model, or a model using a neural network is considered. That is, a model capable of expressing the movement of the control target with enough accuracy is desirable. When the input-output response relation is obtained by a Fourier transformation as described above in the prior art, the relation is applied only to a case where the same operation pattern having a uniform frequency is repeated. For that reason, it is desirable to use a model expressed by a time region or a variable region that can restore a time response. In the present embodiment, the model used for the calculation of the control-target-response calculation unit 202 is set as a model in which a relationship between the components of the control target is expressed as a block diagram and a response is calculated by a discrete time system and the sampling time is set as the output cycle of the current instruction in the control device.

Next, the instruction path generation unit 105 uses the path comparison unit 502 to calculate the error between the target path kept in the convergence-determination-condition-added-target-path keeping unit 501 and the response path received from the instruction response calculation unit 102. Further, when a predetermined error display condition includes meeting the convergence determination condition, it is provisionally determined whether the convergence determination condition is met (step S108).

When the path comparison unit 502 calculates the error, it is desirable to consider the time delay or the phase difference between the target path and the response path.

Figure 13:
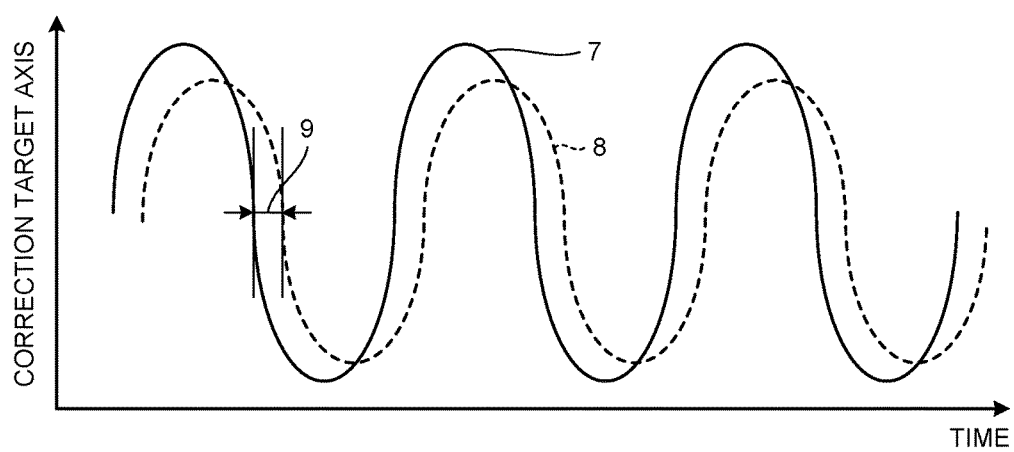
FIG. 13 is a diagram illustrating a relationship between an axis position and a time.
Figure 14:
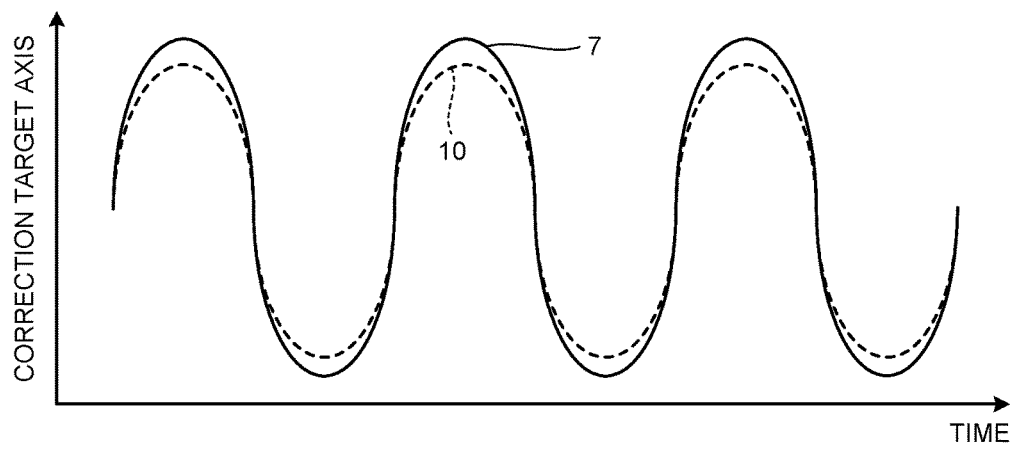
FIG. 14 is a diagram illustrating a relationship between a target path and a path obtained by shifting a response path by a time delay.

FIG. 13 is a diagram illustrating a relationship between an axis position and time. FIG. 14 is a diagram illustrating a relationship between the target path and the path obtained by shifting the response path by a time delay. Specifically, as illustrated in FIG. 13, a time delay 9 between a response path 8 and a target path 7 obtained when plotting a change in time for each axis position is calculated and the target path 7 is compared with a path 10 obtained by shifting the response path 8 by the time delay 9 in order to evaluate an error as illustrated in FIG. 14.

Figure 15:
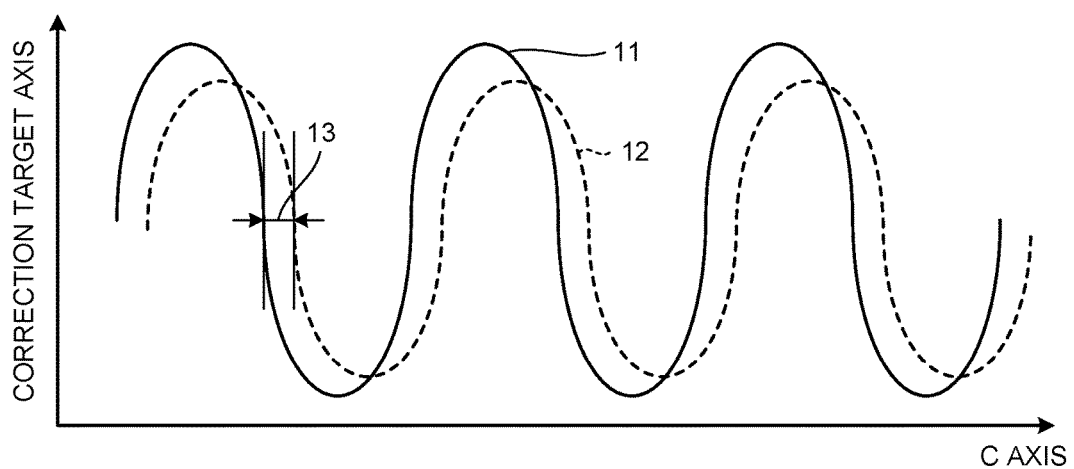
FIG. 15 is a diagram illustrating a phase difference between a target path and a response path when a position of a correction target axis corresponding to a C-axis position is plotted.

When the correction target axis is designated by the correction-target-axis input unit 106, the time delay of the axis other than the correction target axis is not removed. For this reason, even when the time delay of the correction target axis is removed, a phase difference occurs between the correction target axis and the axis that is not the correction target. Accordingly, when the correction target axis is designated by the correction-target-axis input unit 106, the time delay 9 of the axis that is not the correction target may be calculated. Then, the time delay 9 of the axis that is not the correction target may be subtracted after the calculation of the time delay 9 of the correction target axis. In particular, since it is important to synchronize the C axis and the X axis in machining the non-circular workpiece as the target of the present embodiment, it is desirable to remove the phase difference between the C axis and the X axis as described above when the C axis is not the correction target axis. Further, in that case, it is desirable to remove the phase difference between the C axis and the Z axis when the Z axis is also the correction target axis. Further, since the C-axis position is accumulated without being reset for every rotation in the processing in the instruction value generation device, the C-axis position monotonously increases or decreases in the machining operation on the non-circular workpiece as the target of the present embodiment. When the C axis is not the correction target axis, the phase difference between the C axis and the correction target axis may be removed taking account of the phase difference between the target path and the response path when the correction target axis position corresponding to the C-axis position is plotted. FIG. 15 is a diagram illustrating the phase difference between the response path and the target path when the correction target axis position corresponding to the C-axis position is plotted. When the C axis is not the correction target axis, the phase difference between the C axis and the correction target axis may be removed taking account of a phase difference 13 between a response path 12 and a target path 11 when the correction target axis position corresponding to the C-axis position is plotted.

Next, the instruction path generation unit 105 determines whether either the condition that the error display request is received from the error display request input unit 108 or the previously input error display condition is met (step S109).

When none of those conditions is met (step S109/No), the routine proceeds to step S112.

When any of the conditions is met (step S109/Yes), the instruction path generation unit 105 gives the error display unit 109 the error calculated by the path comparison unit 502 and the error display unit 109 displays the error received from the instruction path generation unit 105 (step S110).

Next, the convergence-determination-condition determination unit 103 checks whether the user inputs to change the convergence determination condition. When this change is input, the target path to which the changed convergence determination condition is added is given to the instruction path generation unit 105 (step S111).

Next, the instruction path generation unit 105 uses the path comparison unit 502 to determine whether the convergence determination condition is met (step S112).

When it is determined that the convergence determination condition is not met in step S112 (step S112/No), the instruction path generation unit 105 uses the response error correction unit 503 therein to change the correction path kept in the correction path keeping unit 504 (step S113).

Specifically, the response error correction unit 503 first receives the correction path from the correction path keeping unit 504, receives, from the path comparison unit 502, the error of each axis in each instruction, and subtracts the error from the position in each instruction of the correction path in each axis. However, at this time, the subtraction of the error is not done for the axis that is not the correction target axis. Then, the response error correction unit 503 stores the changed correction path in the correction path keeping unit 504. It is desirable to take account of the phase difference of each axis as in the case of calculating the error in step S108 when the error is subtracted. In that case, the error delayed by the phase difference in each instruction may be subtracted taking account of the delay of each axis by the phase difference obtained in step S108. Further, when the C axis is not the correction target axis, the phase difference in plane between the C-axis position and the correction target axis position may be taken into account as in step S108.

Next, the routine returns to step S105 in which the feed-forward processing is performed.

When it is determined that the convergence determination condition is met in step S112 (step S112/Yes), the instruction path generation unit 105 gives the movement instruction output unit 115 the instruction path kept in the instruction path keeping unit 506 (step S114).

Next, the movement instruction output unit 115 creates a machining program on the basis of the received instruction path and outputs the machining program (step S115).

As described above, according to the present embodiment, since the instruction response calculation unit 102 is used to calculate the response of the control target on the basis of the model on the calculator, it is possible to generate an instruction even in the machining operation in which the operation pattern changes such as the machining operation on the non-circular workpiece having various cross-sectional shapes to which the prior art is not applicable. Further, since only the reproducible error depending on the characteristic of the control target can be taken into account, it is possible to stably and highly accurately generate an instruction compared with the prior art.

Additionally, since an error caused by inertia, viscosity, or elasticity as mechanical characteristics, an error caused by the reverse rotation of the axis, an error caused by a reaction force during the machining, and an error caused by a response delay of a feed-back loop processing in the control device are calculated in the model, it is possible to generate an instruction taking account of these errors.

Additionally, since the accuracy for each part of the finished shape can be set by the convergence-determination-condition determination unit 103, it is possible to reduce the allowable error and increase the number of times the convergence determination is made at the accuracy-required position and to determine that the convergence determination condition is met regardless of the error at the position not requiring the accuracy. This shortens the time necessary for generating an instruction while guaranteeing the accuracy for the accuracy-required position.

Additionally, since the correction target axis can be designated by the correction-target-axis input unit 106, it is possible to shorten the time necessary for generating an instruction and improve the accuracy of an actual machining operation by designating an axis having high responsiveness and exhibiting a delicate correction effect to achieve a given target path.

Additionally, since the error between the response path and the target path is checked by the error display unit 109 and the convergence determination condition can be changed by the convergence-determination-condition determination unit 103, it is possible to shorten the time taken for generating an instruction by relaxing the convergence determination condition when the error between the response path and the target path is large at the position not requiring the accuracy. The convergence determination condition can be corrected halfway when the convergence determination condition at the accuracy-required position is relaxed. Accordingly, there is no need to generate an instruction again from the beginning and thus the time taken for generating the instruction can be shortened.

Additionally, in the present embodiment, the finished shape data of the workpiece is used in order to determine the target path, but the present invention is not limited thereto. For example, the path may be directly input. In that case, the acceleration/deceleration processing may be performed on the path received by the target path determination unit 104 and the path subjected to the acceleration/deceleration processing may be used as the initial value of the correction path and the target path.

Further, in the present embodiment, the convergence determination condition is changed only in the case where the error is displayed, but the present invention is not limited thereto. For example, the convergence determination condition may be changed regardless of the display of the error.

Further, in the present embodiment, since the input finished shape is obtained by a single cutting operation, the cutting amount increases depending on the shape of the workpiece. In that case, a plurality of shapes may be created in such a manner that they are offset from the input finished shape and instructions generated on the basis of the respective shapes may be combined so as to create an instruction to gradually perform a machining operation over a plurality of cutting operations.

Further, although the present embodiment is described in conjunction with the machining on the non-circular workpiece, the present invention is not limited thereto. For example, an instruction for the machining on other components and the die machining may be generated. In that case, a path that is created by an application such as a CAM (Computer Aided Manufacturing) may be input as described above.

INDUSTRIAL APPLICABILITY

As described above, the instruction value generation device according to the present invention is useful in that it can handle a machining operation during which the operation pattern changes and stably generate the instruction.

REFERENCE SIGNS LIST 1 workpiece, 2 tool, 3 non-circular machined part, 4 groove, 5 finish shape of workpiece, 6 extension shape corresponding to clearance distance, 7 target path, 8 response path, 9 time delay, 10 path obtained by shifting response path by time delay, 11 target path when horizontal axis is C axis, 12 response path when horizontal axis is C axis, 13 phase difference, 80 piston, 101 instruction value generation device, 102 instruction response calculation unit, 103 convergence-determination-condition determination unit, 104 target path determination unit, 105 instruction path generation unit, 106 correction-target-axis input unit, 107 error display condition input unit, 108 error display request input unit, 109 error display unit, 110 shape data input unit, 111 speed data input unit, 112 time constant data input unit, 113 dwell clearance input unit, 114 feed-forward parameter input unit, 115 movement instruction output unit, 201 control-device-response calculation unit, 202 control-target-response calculation unit, 203 control-device-parameter input unit, 204 control-target-model input unit, 301 shape data storage unit, 302 shape data display unit, 303 allowable error input unit, 304 convergence-determination-times input unit, 305 non-cutting position input unit, 306 convergence-determination-condition addition unit, 307 convergence-determination-condition-addition instruction unit, 401 cross-sectional-shape-data creation unit, 402 instruction position interpolation unit, 403 acceleration/deceleration processing unit, 501 convergence-determination-condition-added-target-path keeping unit, 502 path comparison unit, 503 response error correction unit, 504 correction path keeping unit, 505 feed-forward processing unit, 506 instruction path keeping unit, 600 computer, 601 CPU, 602 RAM, 603 ROM, 604 storage unit, 605 input unit, 606 display unit, 609 communication I/F, 700 control device.

The invention claimed is:

1. An instruction value generation device comprising:
a hardware processor; and
a memory storing instructions which, when executed by the hardware processor, cause the hardware processor to:
predictively calculate, by using an instruction response calculator, on a basis of a model of a control target on a calculator, a parameter of the model of the control target on the calculator, and a parameter of a control device controlling the control target, a response path along which the control target is actually operated when an instruction path is given;
determine a target path that is an ideal path of the control target on a basis of shape data to which speed data on each part of a workpiece finished shape provided by the control target is added, a time constant, and a dwell rotation number and a clearance distance at a time of starting and ending an operation of the control target;
regenerate a temporary instruction path such that an error between the target path and a temporary instruction response path calculated by the instruction response calculator when the temporary instruction path is given to the instruction response calculator is smaller than a current value;
receive the target path and determine, on the basis of the shape data, a convergence determination condition in each zone of the target path, the convergence determination condition being changeable and being used in a determination processing of determining whether the error between the temporary instruction response path and the target path is converged; and
perform the determination processing on a basis of the convergence determination condition, wherein
the instructions further cause the hardware processor to repeat the regeneration of the temporary instruction path and the calculation of the temporary instruction response path by the instruction response calculator until the hardware processor determines that the convergence determination condition is met, and in response to the hardware processor determining that the convergence determination condition is met, the hardware processor outputs the temporary instruction path to the control device, as the instruction path for operating the control target, to cause the control device to control physical movement of the control target along the instruction path to thereby machine a workpiece.

2. The instruction value generation device according to claim 1, wherein the instructions further cause the hardware processor to:
receive an input of a parameter of a model regarding behavior of the control target and a parameter of the control device regarding behavior of the control device, and
control the instruction response calculator to calculate the response path on a basis of the parameters received at the inputter and the model capable of simulating at least one of the behavior of the control target and the behavior of the control device.

3. The instruction value generation device according to claim 2, wherein
the behavior of the control target is at least one of behavior caused by elasticity of the control target, behavior of the control target when a rotation of an axis is reversed, behavior of the control target when the control target is affected by thermal displacement, and behavior of the control target when the control target receives a reaction force during machining, and
the behavior of the control device is at least one of behavior of a speed feed-back loop processing inside the control device, behavior of a processing performed inside the control device so as to correct an influence caused by inertia, behavior of a processing performed inside the control device so as to correct an influence caused by viscosity, behavior of a processing performed inside the control device so as to correct an influence caused by elasticity, behavior of a processing performed inside the control device so as to correct an influence caused by a reverse rotation of the axis, behavior of a processing performed inside the control device so as to correct an influence caused by a thermal displacement, behavior of a processing performed inside the control device so as to correct an influence caused by a reaction force during machining, and behavior of a filter processing performed inside the control device so as to smoothen an instruction value.

4. The instruction value generation device according to claim 1, wherein
the instructions further cause the hardware processor to determine whether the convergence determination condition is met in each of a plurality of divided zones of the target path, and determine that the convergence determination condition is met in the entire target path when the convergence determination condition is met in all of the zones.

5. The instruction value generation device according to claim 4, wherein the instructions further cause the hardware processor to:
set a number of times convergence determination is made for each of the divided zones of the target path or all of the zones of the target path, and
determine that the convergence determination condition is met when a number of repetitions of regeneration of the temporary instruction path is equal to or larger than the number of times convergence determination is made.

6. The instruction value generation device according to claim 4, wherein the instructions further cause the hardware processor to:
control a display to display a difference between the target path and the response path in each of the zones of the target path when a predetermined error display condition is met, and
change the convergence determination condition in each of the zones of the target path.

7. The instruction value generation device according to claim 1, wherein
the instruction path includes a plurality of axis components, and
the instructions further cause the hardware processor to:
receive a designation of an axis having an axis component that is to be corrected by regenerating the temporary instruction path, and
correct the axis component of the instruction path only for the designated axis which is received by the hardware processor.

* * * * *